(12) United States Patent
Olsvik

(10) Patent No.: US 6,899,859 B1
(45) Date of Patent: May 31, 2005

(54) METHOD FOR PREPARING A $H_2$-RICH GAS AND A $CO_2$-RICH GAS AT HIGH PRESSURE

(75) Inventor: Ola Olsvik, Hundhammeren (NO)

(73) Assignee: Den Norske Stats Oljeselskap A.S., Stavanger (NO)

( * ) Notice: Subject to any disclaimer, the term of this patent is extended or adjusted under 35 U.S.C. 154(b) by 0 days.

(21) Appl. No.: 09/787,301
(22) PCT Filed: Sep. 15, 1999
(86) PCT No.: PCT/NO99/00283
§ 371 (c)(1), (2), (4) Date: Mar. 16, 2001
(87) PCT Pub. No.: WO00/18681
PCT Pub. Date: Apr. 6, 2000

(30) Foreign Application Priority Data

Sep. 16, 1998 (NO) ................................................ 984296

(51) Int. Cl.⁷ ............................. C01B 3/02; C01B 31/20
(52) U.S. Cl. .................. 423/437.1; 252/373; 423/651; 423/652
(58) Field of Search ..................... 252/373; 423/437.1, 423/651, 652

(56) References Cited

U.S. PATENT DOCUMENTS 3,652,454 A     3/1972  Robin et al. ................ 252/373
4,946,667 A  *  8/1990  Beshty ...................... 423/648.1
5,714,132 A     2/1998  Kapoor et al. ............. 423/418.2
5,832,712 A  * 11/1998  Ronning et al. ............ 60/39.02
6,090,312 A  *  7/2000  Ziaka et al. ................ 252/373

FOREIGN PATENT DOCUMENTS

| CA | 868821 | 4/1971 | |
| JP | 05295374 A | * 11/1993 | ............. C10L/3/06 |
| WO | WO 94/26656 | * 11/1994 | ............. C01B/3/38 |
| WO | 9829333 | 7/1998 | |

* cited by examiner

Primary Examiner—Stanley S. Silverman
Assistant Examiner—Jonas N. Strickland
(74) Attorney, Agent, or Firm—Wenderoth, Lind & Ponack, L.L.P.

(57) ABSTRACT

The present invention concerns a method for preparing a $CO_2$-rich gas stream for injection purposes or deposition, and a hydrogen rich gas stream, the method comprising the following steps: a) natural gas and $H_2O$ are fed into a one-step reforming process for preparing a gas mixture comprising $CO_2$ and $H_2$ under supercritical condition for water from about 400° C. to about 600° C. and pressure from about 200 to about 500 bar in the reforming reactor; b) the gas mixture from a) is separated into a $H_2$-rich and $CO_2$-rich gas stream, respectively. The invention also comprises use of $CO_2$-rich gas stream for injection into marine formations, and use of $H_2$-rich stream for hydrogenation, as a source of energy/fuel in fuel cells and for production or electricity.

15 Claims, 1 Drawing Sheet

METHOD FOR PREPARING A H₂-RICH GAS AND A CO₂-RICH GAS AT HIGH PRESSURE

Figure 1:
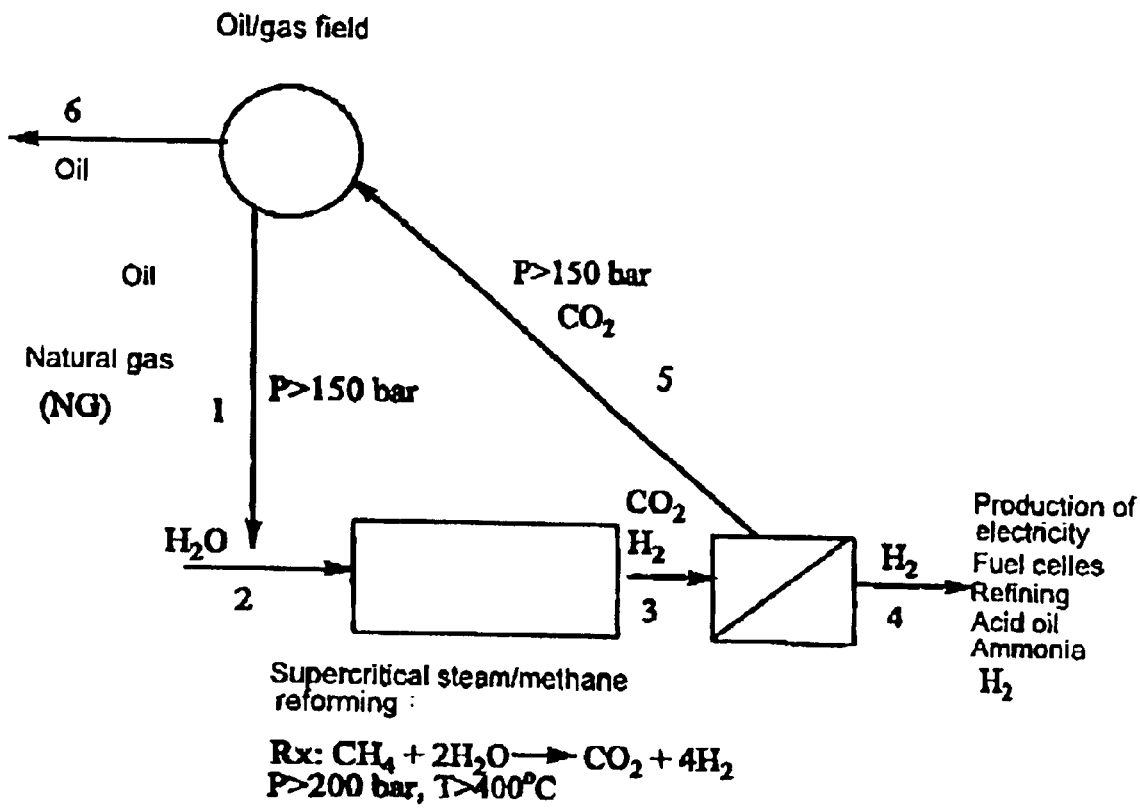

This application is a 371 application of PCT/NO99/00283 filed Sep. 15, 1999.

The present invention comprises a method for production of a $CO_2$-rich gas for injection purposes or to be deposited, and a hydrogen-rich gas, and use thereof.

It is commonly assumed that the greenhouse effect and the climate on earth are closely connected to human made emissions of $CO_2$. These emissions are primarily formed by combustion of coal and hydrocarbons, e.g. by generation of heat and electric power. A desirable goal is therefore to reduce the emission of $CO_2$ to the atmosphere.

It is known art to reduce the emission of $CO_2$ from combustion of natural gas, e.g. by gas reforming and shift technology for preparation of a mixture consisting of hydrogen and carbon dioxide. These components are then separated, whereafter hydrogen is used as fuel in a gas turbine and carbon dioxide is deposited after compression to desired pressure. The deposition can be made on the bottom of the sea or in geological reservoirs. The reservoirs can also contain hydrocarbons. The above mentioned technique is e.g. described in Teknisk Ukeblad No. 16, page 8, 1998.

Known art comprising gas reforming and shift technology as described above is very expensive and at the same time gives less energy yield than a conventional, modern gas power plant.

U.S. Pat. No. 3,652,454 describes preparation of $CO_2$ and $H_2$ from a gas stream containing CO by an improved continuous catalytical shift re action at high pressure. The reaction takes place in one or more shift reactors at a superatmospheric pressure of from 35 to 250 atmospheres, and a temperature between 287° C. and 537° C. The patent does not describe reforming of natural gas.

From EP 0 000 993-A1 is known a method for preparation of ammonia by means of a primary and a secondary catalytic reforming of an hydrocarbon stream at superatmospheric pressure. From the primary catalytic reforming the ratio of steam to carbon is from 2.5 to 3.5, the pressure is from 30 to 120 bar and the temperature out of the reactor is from 750 to 850° C. From the secondary catalytic reforming the content of methane is from 0.2 to 10% by weight on a dry basis and the ratio of hydrogen to nitrogen is from 2.2 to 2.7. To the secondary reforming there is added an excess of air for preparing a gas with a higher content of methane, i.e. at a lower temperature, and/or a lower steam ratio and/or a higher pressure. In the above mentioned EP patent $CO_2$ is removed at a low pressure by taking out hydrogen at an elevated pressure for further use by the preparation of ammonia.

EP 0 289 419 describes a catalytic steam reforming of hydrocarbons for preparing hydrogen in an ammonia process. The catalytic steam reforming takes place at a pressure from 25 to 120 bar, a temperature from 800 to 1000° C. and at a ratio of steam:carbon of 1.8-2.5. The process is operated in such a way that there are less than 0.3% impurities in the $H_2$-rich gas which is to be used for production of ammonia. The present invention allows a higher content than 0.3% of CO, $CO_2$ and $CH_4$ in the $H_2$-rich gas stream.

CA 868,821 describes preparation of synthesis gas by steam reforming of hydrocarbons in a gas and a liquid at 50–250 absolute atmospheres, preferably 160 abs. atm. for production of ammonia and methanol.

Known art does not deal with a one step process for production of a $CO_2$-rich gas and $H_2$-rich gas under supercritical conditions for water, where a $CO_2$-rich gas mixture is taken out at an elevated pressure in the interval from 20 to 200 bar for injection or deposition in marine formations. The present invention involves reduced compression costs by deposition or injection in marine formations because the $CO_2$-rich gas mixture is taken out at an elevated pressure.

The present invention comprises a method for preparing a $CO_2$-rich gas stream and a hydrogen rich gas stream, the method comprising the following steps:

a) natural gas and $H_2O$ are fed to a one-step reforming process for preparing a gas mixture comprising $CO_2$ and $H_2$ under supercritical conditions for water;

b) the gas mixture from a) is separated into a $H_2$-rich and a $CO_2$-rich gas stream, respectively.

Further the temperature in the reforming reactor is from about 400° C. to about 600° C., and the method is also characterized by a pressure in the reforming reactor from about 200 to about 500 bar. The $CO_2$-rich gas stream from the separation unit is at a pressure in the interval from 20 to 200 bar. In the present invention the mixture in the reforming reactor may be passed over a catalyst bed. The reforming can also be carried out without catalyst. The present invention also concerns use of the $CO_2$-rich gas stream prepared according to the previously mentioned method, where the $CO_2$-rich gas stream is injected into marine formations. Further, the invention comprises use of the $H_2$-rich gas stream prepared according to the invention, where the $H_2$-rich gas stream can be utilized for hydrogenation, the production of electricity and as a source of energy/fuel in fuel cells.

The following reaction takes place during the reforming:

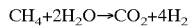

$$CH_4 + 2H_2O \rightarrow CO_2 + 4H_2$$

The reforming reactor is operated at supercritical conditions for water. The temperature in the reforming reactor is from about 400° C. to about 600° C. and the pressure in the reforming reactor is from about 200 to about 500 bar. It is an object of the present invention that $CO_2$ is separated from the gas stream at a pressure of at least 20 bar and maximum 200 bar before being injected into marine formations or by deposition. The reforming reaction takes place over a suitable catalyst bed. The reforming can also take place without catalyst in the reforming reactor. It is also an object of the present invention to use $H_2$ made according to the method of the invention, for hydrogation, and for production of electricity. Use of $H_2$ as a source of energy/fuel in fuel cells is further comprised by the present invention.

$CO_2$ is an acid gas, and the most widely used method to separate the mentioned gas from other non-acid gas molecules is absorption. During absorption the different chemical properties of the gas molecules are utilized. By contacting the gas mixture with a basic liquid the acid gases to a high degree will be dissolved in the liquid. The liquid is separated from the gas and the absorbed gas can then be set free either by altering the composition of the liquid or by altering pressure and temperature. For separation of $CO_2$ mainly aqueous solutions of alcoholamines are used. The absorption takes place at a relatively low temperature and high pressure, while stripping of the gas from the liquid is carried out at a relatively high temperature and low pressure. To liberate $CO_2$ from the amine phase in the stripping unit stripping steam is usually used. If the partial pressure of $CO_2$ in the gas into the absorber is high, e.g. higher than 15 bar, it is possible to obtain high concentrations in the amine phase, and a large part of absorbed $CO_2$ can be set free in the stripping unit at elevated pressure, e.g. 5–8 bar.

By the use of one or more semipermeable membrane units it is possible to achieve that molecules of different molecular weight and different properties permeate the membrane at different velocities. This principle can be utilized to separate gases. For the gas mixture in question membranes can be selected where $H_2$ permeates rapidly, whereas $CO_2$ permeates slowly, whereafter a separation-in-part of the different gas components is achieved. By combining solid membranes and liquid membranes it is also possible to achieve a rapid permeation of $CO_2$, while $H_2$ is kept back. It can be difficult to achieve complete separation of the different gas components by using different separation methods. This is especially the case by use of membranes. For gas mixtures which are going to be burned, a partial separation of hydrogen and CO, will be sufficient.

In the present invention it is desirable to deposit out-separated $CO_2$. Large amounts of $CO_2$ can be deposited according to various methods, of which the three most interesting are deposition at very deep oceans, deposition in deep water reservoirs and deposition in oil reservoirs wherein the gas at the same time functions as a drive agent for enhanced oil recovery. The two last mentioned storage methods are operated commercially. In these storage forms the $CO_2$ gas has to be brought to high pressure for transport in pipelines to a deposition well and further to injection. The injection pressure will vary, but could be in the range 50 to 300 bar. If the $CO_2$ gas can be separated from the $H_{12}CO_2$ mixture at an elevated pressure, significant compression work can be avoided, and this is the case in the present invention.

The invention is further elucidated on FIG. 1. Natural gas (1) is passed from an oil/gas field, and blended with $H_2O$ (2) before the mixture is passed to reforming at supercritical conditions. Produced synthesis gas (3) is separated at high pressure into two streams, a $CO_2$-rich stream (5), which is injected into an oil/gas field, and a $H_2$-rich stream (4), respectively. The $H_2$-rich stream is further used for hydrogenation, as a source of energy in fuel cells, and for production of electricity.

EXAMPLE 1

The example concerns one or more membrane units wherein the $CO_2$-rich gas can have a pressure approximately equal to the partial pressure of $CO_2$ into the separation unit, as shown in Table 1 below.

TABLE 1

| Total inlet pressure on the separation unit (bar) | Partial pressure of $CO_2$ out of the separation unit (bar) |
| --- | --- |
| 200 | 40 |
| 250 | 50 |
| 300 | 60 |

EXAMPLE 2

Supercritical conditions occur at pressures above 220 bar and temperatures above 374° C.

In this example it is described at which conditions supercritical conditions occur in the present reactor.

The relationship between temperature and pressure in the reactor in the present invention is as shown in Table 2. Supercritical conditions occur in the reactor when the values of pressure and temperature are higher than shown in Table 2.

TABLE 2

| Pressure (bar) | Temperature (° C.) |
| --- | --- |
| 1100 | 354 |
| 750 | 356 |
| 500 | 362 |
| 300 | 368 |
| 220 | 374 |

Relationship between temperature and % fraction $H_2O$ at 220 bar is shown in Table 3. Supercritical conditions occur in the reactor when the values for temperature and % fraction $H_2O$ at a pressure of 220 bar are higher than shown in Table 3.

TABLE 3

| % fraction $H_2O$ (P = 220 bar) | Temperature (° C.) |
| --- | --- |
| 0.95 | 372 |
| 0.85 | 365 |
| 0.75 | 353 |

The relationship between pressure and % fraction $H_2O$ at a temperature of 374° C. is shown in Table 4. Supercritical conditions occur in the reactor when the values for pressure and % fraction $H_2O$ at 374° C. are higher than shown in Table 4.

TABLE 4

| % fraction $H_2O$ (T = 374° C.) | Pressure (bar) |
| --- | --- |
| 0.95 | 300 |
| 0.85 | 400 |
| 0.75 | 1000 |

What is claimed is:
1. A method for preparing a $CO_2$-rich gas stream and a $H_2$-rich gas stream, which comprises:
   a) feeding natural gas and $H_2O$ into a reforming reactor to form a gas mixture,
   b) subjecting the gas mixture to a one-step reforming reaction under supercritical heat and pressure conditions for water to form a reformed gas mixture; and
   c) separating the reformed gas mixture into a $H_2$-rich gas stream and a $CO_2$-rich gas stream, wherein the separated $CO_2$-rich gas stream has a pressure within a range from 20 to 200 bar.
2. The method according to claim 1, wherein the temperature in the reforming reactor is from about 400° C. to about 600° C.
3. The method according to claim 2, wherein the pressure in the reforming reactor is from about 200 to about 500 bar.
4. The method according to claim 2, wherein the gas mixture in the reforming reactor is passed over a catalyst bed.
5. The method according to claim 2, wherein the reaction in the reforming reactor is carried out without a catalyst.
6. The method according to claim 1, wherein the pressure in the reforming reactor is from about 200 to about 500 bar.
7. The method according to claim 6, wherein the gas mixture in the reforming reactor is passed over a catalyst bed.
8. The method according to claim 6, wherein the reaction in the reforming reactor is carried out without a catalyst.
9. The method according to claim 1, wherein the gas mixture in the reforming reactor is passed over a catalyst bed.

10. The method according to claim 9, wherein the reaction in the reforming reactor is carried out without a catalyst.

11. The method according to claim 1, wherein the reaction in the reforming reactor is carried out without a catalyst.

12. The method according to claim 1, which further comprises injecting the separated $CO_2$-rich gas stream into marine formations.

13. The method according to claim 1, which further comprises transporting the separated $H_2$-rich gas stream for hydrogenation.

14. The method according to claim 1, which further comprises converting the separated $H_2$-rich gas stream to energy/fuel in fuel cells.

15. The method according to claim 1, which further comprises transporting the separated $H_2$-rich gas stream for production of electricity.

* * * * *